(12) United States Patent
Lin et al.

(10) Patent No.: US 9,560,627 B2
(45) Date of Patent: Jan. 31, 2017

(54) ASSISTANCE DATA FOR USE IN DETERMINING A POSITION OF A MOBILE DEVICE

(71) Applicant: QUALCOMM Incorporated, San Diego, CA (US)

(72) Inventors: Ie-Hong Lin, Cupertino, CA (US); Grant Alexander Marshall, Campbell, CA (US); Guttorm Ringstad Opshaug, Redwood, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/811,538

(22) Filed: Jul. 28, 2015

(65) Prior Publication Data

US 2016/0242141 A1   Aug. 18, 2016

Related U.S. Application Data (60) Provisional application No. 62/115,507, filed on Feb. 12, 2015.

(51) Int. Cl.
*H04W 64/00* (2009.01)
*H04W 4/02* (2009.01)
(Continued)

(52) U.S. Cl.
CPC .............. *H04W 64/006* (2013.01); *G01S 1/20* (2013.01); *G01S 5/0236* (2013.01); *H04W 4/025* (2013.01); *H04W 72/0453* (2013.01)

(58) Field of Classification Search
CPC . H04W 64/006; H04W 72/0453; H04W 4/025
See application file for complete search history.

(56) References Cited

U.S. PATENT DOCUMENTS

| 2010/0087204 A1 | 4/2010 | Islam et al. |
| 2012/0015667 A1 | 1/2012 | Woo et al. |

(Continued)

FOREIGN PATENT DOCUMENTS

| EP | 2829134 A1 | 1/2015 |
| WO | 2012044246 A1 | 4/2012 |

OTHER PUBLICATIONS

International Search Report and Written Opinion—PCT/US2016/013918—ISA/EPO—Apr. 5, 2016.

(Continued)

*Primary Examiner* — Nam Huynh
(74) *Attorney, Agent, or Firm* — Muncy, Geissler, Olds & Lowe, P.C.

(57) ABSTRACT

A method for assisting a mobile device to perform positioning measurements on positioning signals periodically transmitted by at least some of a plurality of cells in a wireless communication network includes receiving cell information. The cell information is measured or otherwise obtained by the mobile device and includes measurements/data pertaining to one or more of the plurality of cells in the wireless communication network. The method includes generating assistance data to include an assigned frequency channel number for use by the mobile device for performing the positioning measurements based on the received cell information. The assistance data is then sent to the mobile device.

26 Claims, 5 Drawing Sheets

(51) Int. Cl.
*H04W 72/04* (2009.01)
*G01S 5/02* (2010.01)
*G01S 1/20* (2006.01)

(56) References Cited

U.S. PATENT DOCUMENTS

| | | | |
|---|---|---|---|
| 2012/0184302 A1* | 7/2012 | Kazmi | H04W 64/00 455/456.5 |
| 2014/0094188 A1 | 4/2014 | Kazmi et al. | |
| 2014/0295881 A1 | 10/2014 | Werner et al. | |
| 2015/0018010 A1 | 1/2015 | Fischer | |

OTHER PUBLICATIONS

Fischer S., "Observed Time Difference of Arrival (OTDOA) Positioning in 3GPP LTE", Qualcomm Technologies, inc., Jun. 6, 2014, pp. 1-62.

* cited by examiner

ASSISTANCE DATA FOR USE IN DETERMINING A POSITION OF A MOBILE DEVICE

CROSS-REFERENCE TO RELATED APPLICATION

The present Application for Patent claims the benefit of U.S. Provisional Application No. 62/115,507, entitled "ASSISTANCE DATA SEARCH WINDOW DETERMINATION BASED ON MEASURED CELL INFORMATION FROM UE," filed Feb. 12, 2015, assigned to the assignee hereof, and expressly incorporated herein by reference in its entirety.

FIELD OF DISCLOSURE

This disclosure relates generally to mobile communications and, in particular but not exclusively, relates to the generation of assistance data used to determine the position of wireless mobile stations.

BACKGROUND

The position of a mobile station (device), such as, for example, a cellular telephone, may be estimated based on information gathered from various systems. One such system may include the Global Positioning System (GPS), which is one example of a satellite positioning system (SPS). SPS systems, such as GPS, may include a number of space vehicles (SV) orbiting the earth. Another example of a system that may provide a basis for estimating the position of a mobile station is a cellular communication system including a number of aerial and/or terrestrial base stations to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. Such transmitters may comprise SVs in the case of an SPS and/or terrestrial base stations in the case of a cellular communications system, for example. Ranges to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters.

In a Code Division Multiple Access (CDMA) digital cellular network, the position location capability can be provided by Advanced Forward Link Trilateration (AFLT). In Wideband Code Division Multiple Access (WCDMA) and Long Term Evolution (LTE) networks, the position location capability is provided by Observed Time Difference Of Arrival (OTDOA). These techniques compute the location of the mobile station (MS) from the mobile station's measured time of arrival of radio signals from the base stations. A more advanced technique is hybrid position location, where the mobile station employs a Global Positioning System (GPS) receiver and the position is computed based on both AFLT (or OTDOA) and GPS measurements.

LTE OTDOA positioning technology uses Positioning Reference Signals (PRS) to measure Time Of Arrival (TOA) from each neighboring cell in order to calculate an OTDOA position fix. In order to be able to measure the PRS signals from the serving cell and neighbor cells, user equipment (UE), or a mobile device, send an assistance data request to an OTDOA system server. The server will then send a suite of cells' information (e.g., cell configuration and timing info) to the UE. The server can also "push" the cells' information to the mobile device without the mobile device requesting the information. The information provided to the mobile device, by way of the generated assistance data, helps the mobile device search for the PRS (Positioning Reference Signals). For example, the server can send timing information, such as a search window of the cell. The provided search window relates to an estimated TOA of the PRS within that cell. However, some conventional servers for such positioning systems include fairly rudimentary logic for determining the search window to be included in the OTDOA assistance data. For example, some servers presume a physical location of the mobile device with respect to the cell (e.g., center or border of the serving cell) which may lead to an unnecessarily large estimated search window as well as an inaccurate search window center for at least some of the OTDOA measurements.

The OTDOA positioning component of the mobile device typically shares the same hardware correlator resource with the cellular component, and thus, the number of correlators available to the OTDOA positioning component may be limited. Therefore, searching for PRSs based on unnecessarily large search windows and the inaccurate search window center may extend the time that it takes the mobile device to get a position fix and/or may limit the accuracy of the fix by limiting the number of PRS signals used because of time/resource constraints within the mobile device, itself.

Furthermore, some communication systems may allow cells to express support of different band class numbers to allow mobile devices supporting different frequency channel numbers in different band classes to use the same physical cell. However, some conventional OTDOA servers may only provide OTDOA assistance data on a single channel number, regardless of the band or the channel number supported by the mobile device.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to one aspect, a method for assisting a mobile device to perform positioning measurements on positioning signals periodically transmitted by at least some of a plurality of cells in a wireless communication network includes receiving cell information. The cell information is measured or otherwise obtained by the mobile device and includes measurements/data pertaining to one or more of the plurality of cells in the wireless communication network. The method includes generating assistance data to include an assigned frequency channel number for use by the mobile device for performing the positioning measurements based on the received cell information. The assistance data is then sent to the mobile device.

According to another aspect, an apparatus for assisting a mobile device to perform positioning measurements on positioning signals periodically transmitted by at least some of a plurality of cells in a wireless communication network includes memory adapted to store program code and a processing unit coupled to the memory to access and execute instructions included in the program code. The instructions are configured to direct the apparatus to receive cell information, obtained by the mobile device, of one or more of the plurality of cells in the wireless communication network and to generate assistance data to include an assigned frequency channel number for use by the mobile device for performing the positioning measurements based on the received cell information. The program code also includes instructions to send the assistance data to the mobile device.

According to yet another aspect, an apparatus for assisting a mobile device to perform positioning measurements on positioning signals periodically transmitted by at least some of a plurality of cells in a wireless communication network includes means for receiving cell information, obtained by the mobile device, of one or more of the plurality of cells in the wireless communication network. The apparatus also includes means for generating assistance data to include an assigned frequency channel number for use by the mobile device for performing the positioning measurements based on the received cell information as well as means for sending the assistance data to the mobile device.

According to another aspect, a non-transitory computer-readable medium includes program code stored thereon for assisting a mobile device to perform positioning measurements on positioning signals periodically transmitted by at least some of a plurality of cells in a wireless communication network. The program code includes instructions to receive cell information, obtained by the mobile device, of one or more of the plurality of cells in the wireless communication network and to generate assistance data to include an assigned frequency channel number for use by the mobile device for performing the positioning measurements based on the received cell information. The program code also includes instructions to send the assistance data to the mobile device.

Other objects and advantages associated with the aspects and embodiments disclosed herein will be apparent to those skilled in the art based on the accompanying drawings and detailed description.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
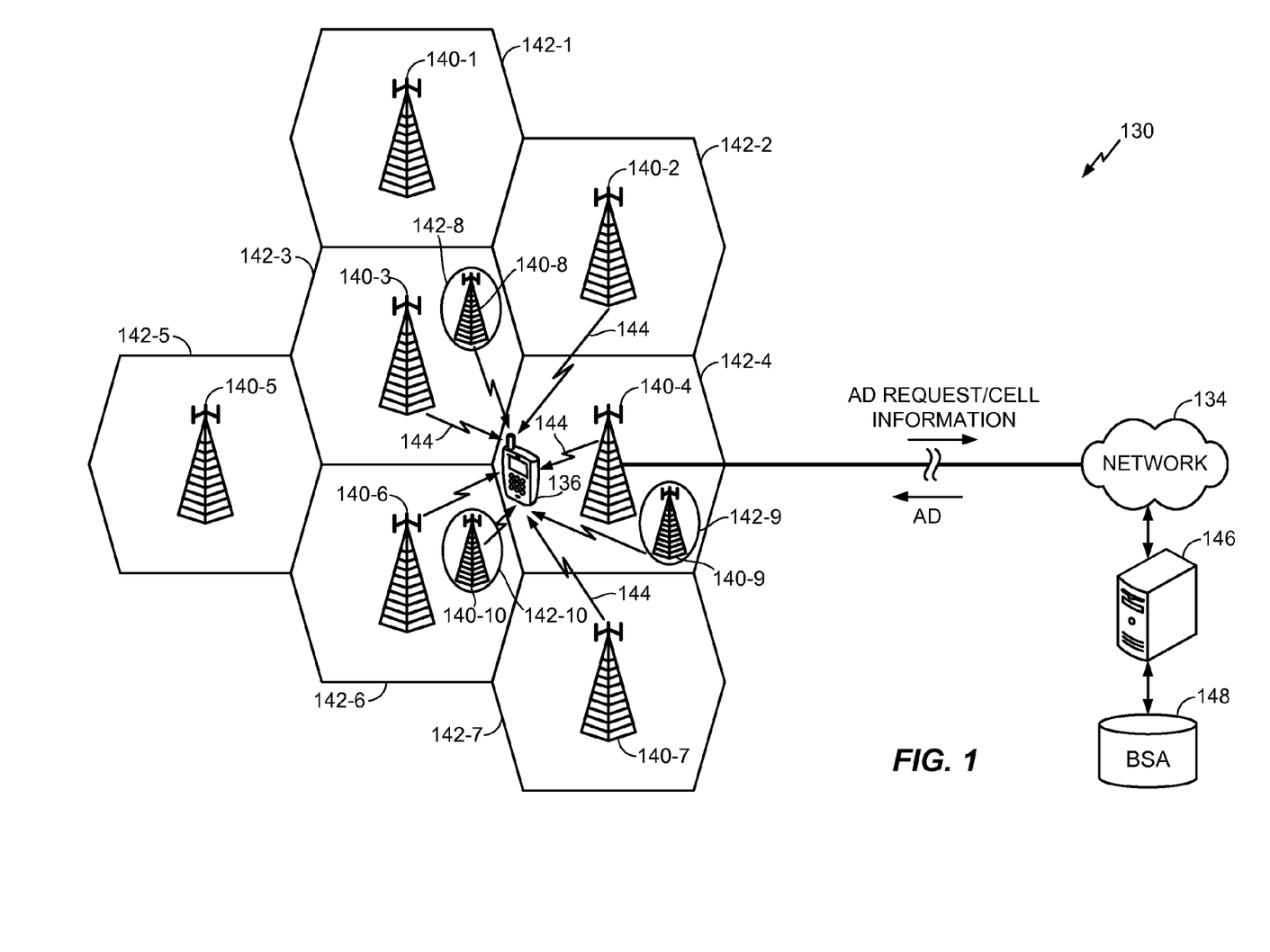
FIG. 1 is a functional block diagram of an example wireless communication system.

FIG. 1 illustrates an example wireless communication network 130 according to one or more embodiments. As shown, wireless communication network 130 includes a network of cells (e.g., cells 142-1 through 142-10), a network 134, a location server 146, and one or more mobile devices 136. The network of cells and the network 134 enable mobile device 136 to access one or more external networks (not shown), such as the Public Switched Telephone Network (PSTN) or the Internet.

Each cell 142-1 through 142-10 includes at least one base station (e.g., 140-1 through 140-10). The base stations 140-1 through 140-10 are geographically distributed across the wide geographic area served by the wireless communication network 130. Each base station 140-1 through 140-10 provides wireless coverage for one or more respective portions of that geographic area, referred to as cells (e.g., cells 142-1 through 142-10). Because of this, mobile device 136 may move within or between cells (e.g., cells 142-1 through 142-10) and may communicate with one or more base stations (e.g., 140-1 through 140-10) at any given position.

Different cells (e.g., 142-1 through 142-10) may have different nominal sizes, depending on the maximum transmit power utilized by the base stations (e.g., 140-1 through 140-10) serving those cells (e.g., 142-1 through 142-10). For example, base station 140-1 may have a relatively large maximum transmit power and correspondingly serves mobile devices 136 within a relatively large cell 142-1, while base station 140-8 may have a relatively small maximum transmit power and correspondingly serves the mobile devices 136 within a relatively small cell 142-8. In general, different base stations that have different pre-defined maximum transmit powers (and thereby serve cells of different nominal sizes) belong to different base station classes (e.g., a macro base station class, a micro base station class, a pico base station class, etc.).

As shown in FIG. 1, mobile device 136, at its current position, is served by base station 140-4 in the sense that the mobile device 136 exchanges data with base station 140-4. Base station 140-4 transmits this data to mobile device 136 on a particular frequency (referred to as the serving cell frequency) and over a particular bandwidth (known as the serving-cell bandwidth). Thus, from the perspective of mobile device 136, base station 140-4 is the serving base station and cell 142-4 is the serving cell. Other cells that are geographically adjacent to, or partially coincident with, the serving cell 142-4 are referred to as neighboring cells. In this example, all cells shown are neighboring cells except for cells 142-1 and 142-5.

Each of the cells (via its base station) periodically transmits a positioning signal 144. A positioning signal 144 is a predetermined signal that is known to both a cell transmitting that signal and, with the aid of assistance data provided by location server 146, by mobile device 136 receiving the signal. The positioning signal 144 may be transmitted by a cell on the same or a different frequency as the serving cell frequency. Positioning signals 144 transmitted by the cells in this way can be measured and used by mobile device 136 to determine a location of the mobile device 136. The positioning signal measurements can also be used by the location server 146 to determine the geographic position of the mobile device 136.

In one embodiment, mobile device 136 may communicate with location server 146 on network 134 for accomplishing such a purpose. This communication between the mobile device 136 and the location server 146 may include one or more transactions between the mobile device 136 and the location server 146. Each transaction pertains to a particular operation, such as the exchange of capabilities, the transfer of cell measurements to the location server 146, the transfer of assistance data from the location server 146 to the mobile device 136 for assisting the mobile device 136 to perform positioning signal measurements, or the transfer of information concerning the ultimate purpose of those measurements (e.g., the actual position of mobile device 136).

Also shown in FIG. 1, is a base station almanac (BSA) 148. The BSA 148 may be maintained for systems used for position estimation and contain various types of information, including, for example, information that may be used in position estimation operations. Such information may include the identities and locations of the various base stations of wireless communication network 130, for example. The term "base station almanac" as used herein is meant to include any organized set of information related to a plurality of cells of a wireless communication network.

The BSA 148 may be stored in a memory of a computing platform, such as the location server 146, or may be included in memory of another computing platform communicatively coupled to the location server 146. As will be described in more detail below, the location server 146 may utilize information contained in the BSA 148 in the generation of assistance data for use by the mobile device 136.

Once assistance data has been generated by the location server 146 and transferred to the mobile device 136, the mobile device 136 may attempt to measure the positioning signals 144 transmitted from multiple different cells (e.g., 42-1 through 42-10).

Figure 2A:
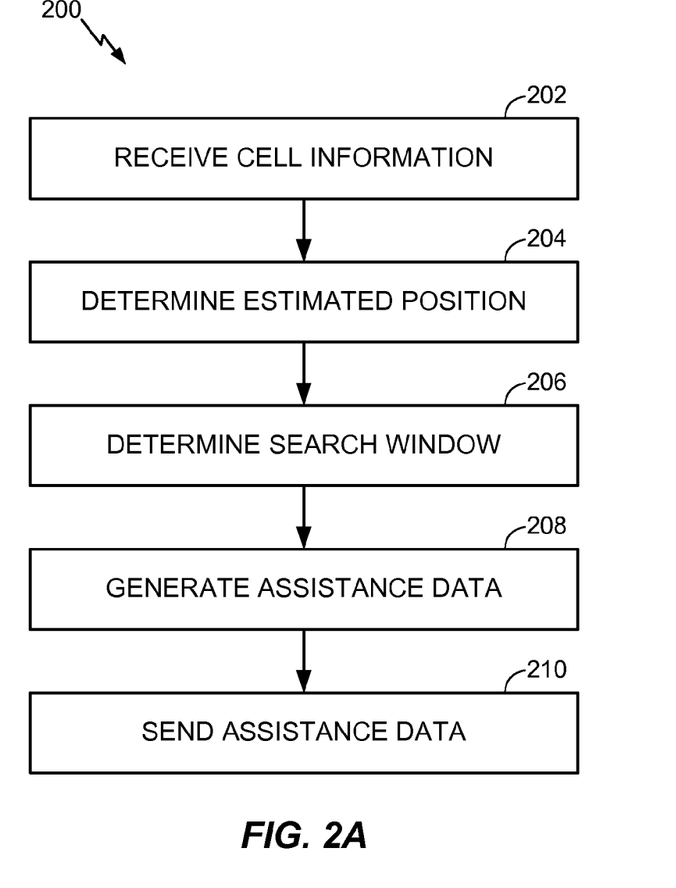
FIG. 2A is a flowchart illustrating a process of assisting a mobile device to perform positioning measurements in a wireless communications system.
Figure 2B:
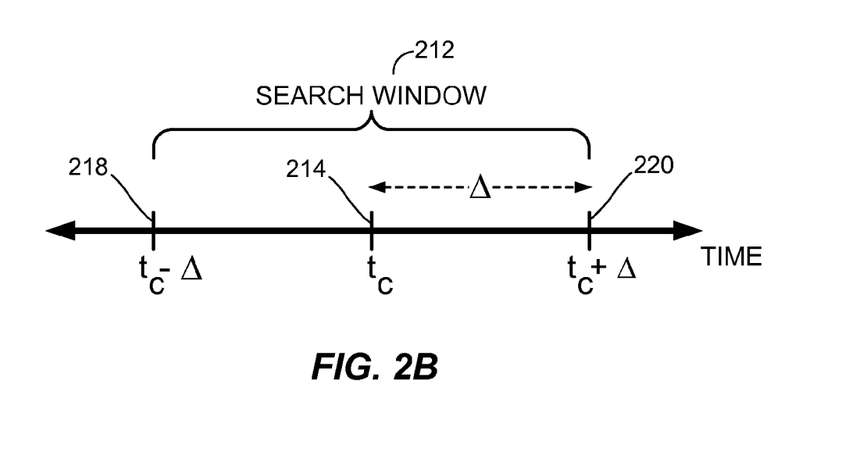
FIG. 2B is a diagram illustrating a search window.

FIG. 2A is a flowchart illustrating a process 200 of assisting a mobile device to perform positioning measurements in a wireless communications system. FIG. 2B is a diagram illustrating an example search window for inclusion in generated assistance data. Process 200 will be described with reference to FIGS. 1-2B.

In some embodiments, process 200 may be performed by location server 146. In the illustrated example, process 200 may begin at process block 202 with the receipt of cell information from the mobile device 136. In some embodiments, process 202 is implemented as part of an Enhanced Cell ID (E-CID) call flow procedure prior to OTDOA measurement. The mobile device 136 may provide the cell information to the location server 146 unsolicited, or in another example, the location server 146 may request, from the mobile device 136, the cell information. The cell information may include E-CID information/data measured, or otherwise obtained, by the mobile device 136. For example, the cell information may include a Mobile Country Code (MCC), a Mobile Network Code (MNC), a Cell ID (CID), an Rx-Tx time difference corresponding to an estimated time difference between reception and transmission times between the reference cell and an antenna of the mobile device 136, a Physical Cell Identifier (PCI), an Evolved Absolute Radio Frequency Channel Number (EARFCN), a Reference Signal Received Power (RSRP), and a Reference Signal Received Quality (RSRQ). The above cell information may be measured data of cells that neighbor the mobile device 136 (e.g., cell 142-2, 142-3, 142-6, 142-7, 142-10, etc.) as well as of the serving cell (e.g., cell 142-4). In one example, the Rx-Tx time difference data included in the measured cell information may only pertain to the serving cell and not to any neighboring cells. In one example, the location server receives the cell information via a Long Term Evolution (LTE) Positioning Protocol (LPP).

Next, in process block 204, the location server 146 determines an estimated position of the mobile device 136 based on the received cell information. In process block 206, the location server 146 may determine the search windows of the Reference Signal Time Differences (RSTDs) between positioning signals 144 transmitted from the neighbor cells and a reference cell that are to be included in the assistance data. In one aspect, the search window represents a predicted interval of time encompassing the delta arrival time at the mobile device 136 between a positioning signal 144 transmitted from a reference cell and a positioning signal 144 transmitted from a neighbor cell. Estimating the position of the mobile device 136 based on the received cell information may allow the location server 146 to more accurately predict this interval of time. In one embodiment, the search window may represent a minimum estimated delta time of arrival (TOA) and a maximum estimated delta TOA of the PRS signal transmitted by the reference cell and the PRS signal transmitted by the neighbor cell. In another embodiment, the search window may be represented by a search window center and search window size. The search window size may represent a level of uncertainty with regards to the search window center. For example, FIG. 2B is a diagram illustrating an example search window 212 for inclusion in generated assistance data. As shown in FIG. 2B, the search window 212 includes a search window center $t_c$ 214 and a search window size of 2*Δ (i.e., 2*DELTA). Thus, search window 212 indicates a minimum delta TOA 218 of $t_c$−Δ and a maximum delta TOA 220 of $t_c$+Δ.

In some embodiments, upon determining an estimated position of the mobile device 136, the location server 146 may determine the neighbor cells for which the mobile device 136 can obtain information. Thus, process 200 may optionally include selecting the set of cells to include in the OTDOA assistance data based on the estimated position of the mobile device 136.

As mentioned above, some systems presume a physical location of the mobile device 136 and thus, selection of the cells to include in the OTDOA assistance data may be inaccurate and/or the associated search window may be unnecessarily large and the associated search window center may be inaccurate in these conventional systems. Accordingly, embodiments of the present disclosure allow for the location server 146 to determine a better approximate location of the mobile device 136 a priori, such that the location server 146 can more accurately predict the OTDOA search window center and the OTDOA search window size (e.g., shorten) included in the assistance data.

Continuing with process 200, after determining the search window based on the estimated position of the mobile device 136, process block 208 includes generating the assistance data to include in the determined search window for one or more of the positioning signals 144 to be used by the mobile device 136 for OTDOA positioning. In one embodiment, the search window(s) may be included in the assistance data as a predicted RSTD (Reference Signal Time Difference) value parameter (i.e., center of search window) and an RSTD uncertainty parameter (i.e., search window size). Next, in process block 210, the location server 146 sends the generated assistance data to the mobile device 136.

Figure 2C:
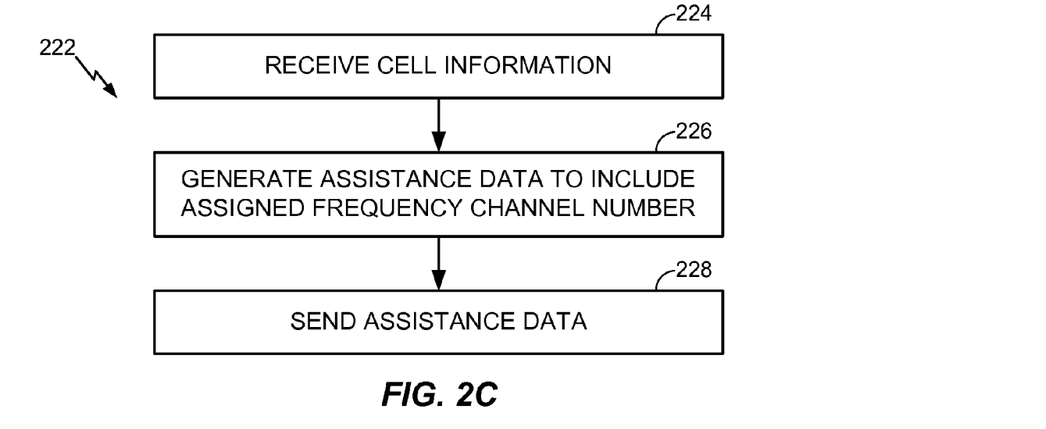
FIG. 2C is a flowchart illustrating a process of assisting a mobile device to perform positioning measurements in a wireless communication system that allow cells to express a physical frequency band with different band class numbers.

FIG. 2C is a flowchart illustrating a process 222 of assisting a mobile device to perform positioning measurements in a wireless communication system (e.g., wireless communication network 130). In one embodiment, wireless communication network 130 is a system that allows cells to express a physical frequency band with different band class numbers. For example, in the protocol specification TS36.331, the Multiple Frequency Band Indicator (MFBI) allows an LTE cell to express the physical frequency band with different band class numbers. This allows mobile devices supporting different bands to use the same physical cell. For instance, an operator may support the frequency 865 MHz, which can be expressed as EARFCN 5900 in BC 18 or EARFCN 8750 in BC 26 (cell sets freqBandIndicator=18 and includes 26 in the multiBandInfoList in SIB1). However, some conventional systems may only allow one evolved absolute radio frequency channel (EARFCN) per E-UTRAN Cell Global Identifier (ECGI) and thus location servers may provide OTDOA AD on this EARFCN to the mobile device, regardless of the band supported by the mobile device. Accordingly, process 222 includes assigning the EARFCN of the reference cell included in the OTDOA AD based on the cell information received from a mobile device. As mentioned above, process 222 of assigning EARFCNs in the OTDOA AD may be implemented for LTE cells with multiple EARFCNs of different band class numbers.

In some embodiments, process 222 may be performed by the location server 146. In the illustrated example, process 222 may begin at process block 224 with the receipt of cell information from the mobile device 136. In some embodiments, process 222 is implemented as part of an Enhanced Cell ID (E-CID) call flow procedure prior to OTDOA measurement. The mobile device 136 may provide the cell information to the location server 146 unsolicited, or in another example, the location server 146 may request, from the mobile device 136, the cell information. The cell information may include E-CID data measured, or otherwise obtained, by the mobile device 136. For example, the cell information may include a Mobile Country Code (MCC), a Mobile Network Code (MNC), a Cell ID (CID), an Rx-Tx time difference corresponding to an estimated time difference between reception and transmission times between the reference cell and an antenna of the mobile device, a Physical Cell Identifier (PCI), an Evolved Absolute Radio Frequency Channel Number (EARFCN), a Reference Signal Received Power (RSRP), and a Reference Signal Received Quality (RSRQ). The above cell information may be measured data of cells that neighbor the mobile device 136 (e.g., cell 142-2, 142-3, 142-6, 142-7, 142-10, etc.) as well as of the serving cell (e.g., cell 142-4). In one example, the Rx-Tx time difference data included in the measured cell information may only pertain to the serving cell and not to any neighboring cells.

Figure 2D:
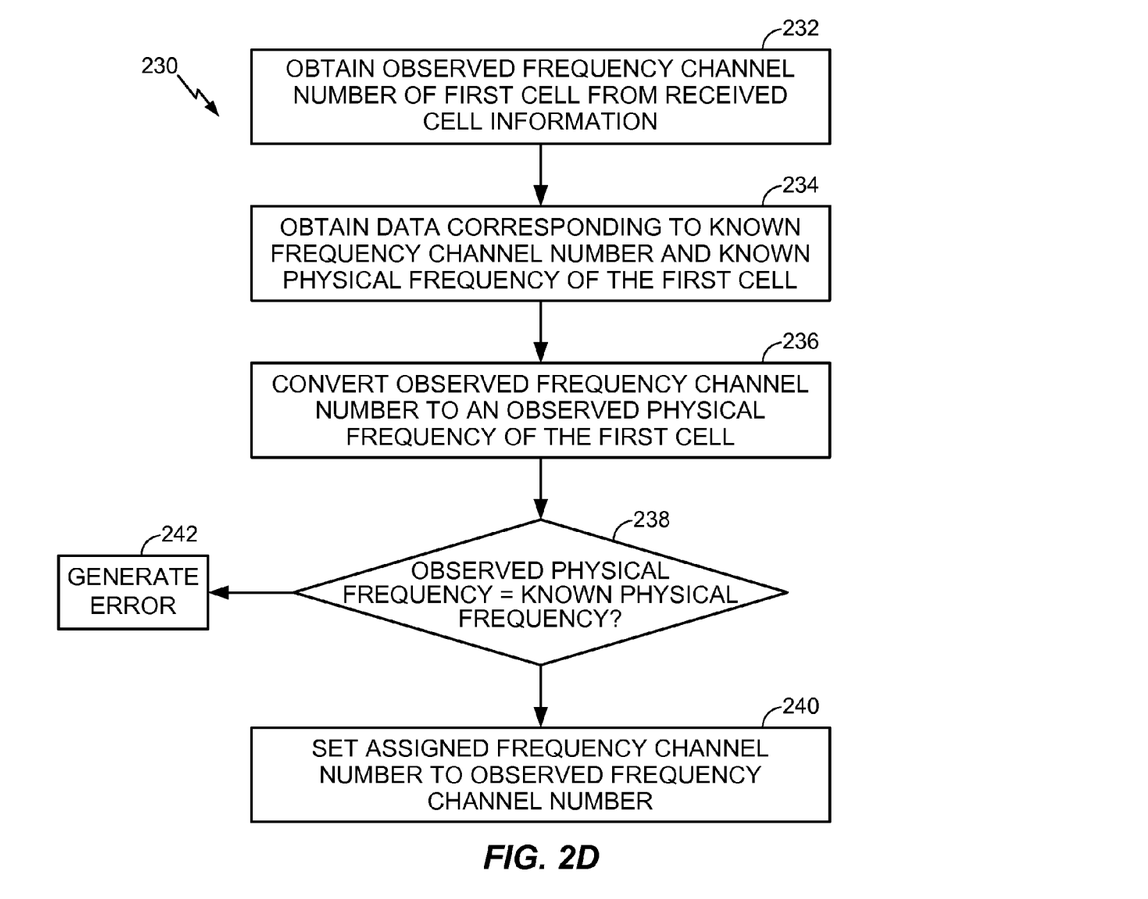
FIG. 2D is a flowchart illustrating a process of generating assistance data to include an assigned frequency channel number based on received cell information.

Next, in process block 226, the location server 146 generates assistance data to include an assigned frequency channel number for use by the mobile device 136 for performing the positioning measurements based on the received cell information. For example, FIG. 2D is a flowchart illustrating a process 230 of generating assistance data to include an assigned frequency channel number based on received cell information. Process 230 is one possible implementation of process block 226 of FIG. 2C.

In one example, the cell information received from the mobile device 136 (e.g., in process block 224) indicates an observed frequency channel number of a first cell in the wireless communication network 130, that is observed by the mobile device 136. The received cell information indicating the observed frequency channel number may be the Evolved Absolute Radio Frequency Channel Number (EARFCN) or the Absolute Radio Frequency Channel Number (ARFCN) of the first cell. In LTE, the EARFCN reflects the center frequency of an LTE carrier (for example 1.4/3/5/10/15/20 MHz carriers). Thus, process block 232, of process 230, includes obtaining (e.g., from the received cell information) the observed frequency channel number of the first cell. Next, in process block 234, the location server 146 obtains data that corresponds to a known frequency channel number and known physical frequency of the first cell. In one example, this data is contained in the BSA 148, either as just the frequency channel number, just the physical frequency, or both, corresponding to a CID of the first cell. If just the frequency channel number is contained in the BSA 148, then process block 234 may optionally include dynamically converting the known frequency channel number into a known physical frequency of the first cell. Similar, to the received cell information, the known frequency channel number may be maintained in the BSA 148 as an EARFCN or as an ARFCN.

Next, in process block 236, the observed frequency channel number is converted into an observed physical frequency of the first cell. For example, an observed frequency channel number of EARFCN 5900 in band class (BC) 18 will be converted to an observed physical frequency of 865 MHz.

As discussed above, a cell may express a physical frequency band with different band class numbers. Thus, the observed frequency channel number may be distinct from the known frequency channel number of the first cell, yet they may both represent the same physical frequency. Thus, in decision block 238, the location server 146 compares the known physical frequency with the observed physical frequency of the first cell. If they are the same, then process 240 includes setting an assigned frequency channel number to the observed frequency channel number to be included in the assistance data. If, however, an observed physical frequency does not match the known physical frequency of the first cell, an error condition may result, which may need to be signaled to the mobile device 136 (i.e., process block 242). In one embodiment, if the observed physical frequency does not match the known physical frequency, then location server 146 may optionally set the assigned frequency channel number to the known frequency channel number, if mobile device 136 supports the band class that the known frequency channel number belongs to.

Returning now to process 222, of FIG. 2C, process block 228 then includes sending the assistance data to include the assigned frequency channel number for use by the mobile device 136 for performing the positioning measurements. The assigned frequency channel number may be included in the generated assistance data as an EARFCN or an ARFCN.

As used herein, the term "mobile station" (MS) or mobile device refers to a device that may from time to time have a position location that changes. The changes in position location may include changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, wearable computer, and/or other portable communication devices. A mobile station may also include a processor and/or computing platform adapted to perform functions controlled by machine-readable instructions.

Figure 3:
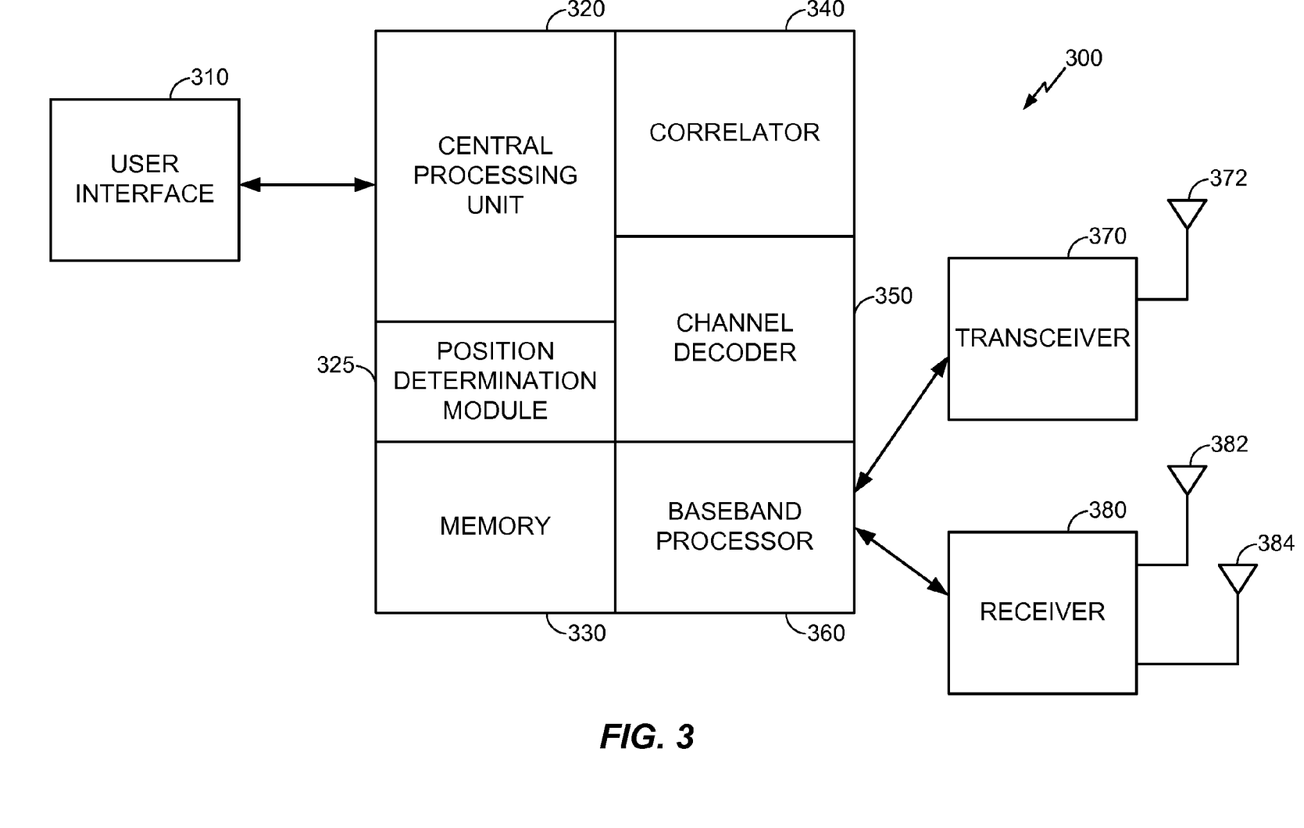
FIG. 3 is a functional block diagram of an example mobile station.

For example, FIG. 3 is a block diagram of an example of mobile device 300 that may be adapted to perform any of the example positioning techniques described herein in connection with FIGS. 1 and 2A-2B. One or more radio transceivers 370 may be adapted to modulate an RF carrier signal with baseband information, such as voice or data, onto an RF carrier, and demodulate a modulated RF carrier to obtain such baseband information. An antenna 372 may be adapted to transmit a modulated RF carrier over a wireless communication link and receive a modulated RF carrier over a wireless communication link. In one embodiment the antenna 372 is adapted to send cellular information and/or assistance data requests to a base station (e.g., base station 140-4 of FIG. 1) and receive assistance data from the base station.

A baseband processor 360 may be adapted to provide baseband information from a central processing unit (CPU) 320 to radio transceiver 370 for transmission over a wireless communications link. Here, CPU 320 may obtain such baseband information from an input device within a user interface 310. The baseband processor 360 may also be adapted to provide baseband information from the radio transceiver 370 to the CPU 320 for transmission through an output device within the user interface 310.

The user interface 310 may comprise a plurality of devices for inputting or outputting user information such as voice or data. Such devices may include, by way of non-limiting examples, a keyboard, a display screen, a microphone, and a speaker.

A receiver 380 may be adapted to receive (via antenna 382 and/or antenna 384) and demodulate transmissions from an SPS, and provide demodulated information to correlator 340. The correlator 340 may be adapted to derive correlation functions from the information provided by the receiver 380. The correlator 340 may also be adapted to derive pilot-related correlation functions from information relating to pilot signals provided by the radio transceiver 370. This information may be used by the mobile device 300 to acquire wireless communications services. Channel decoder 350 may be adapted to decode channel symbols received from the baseband processor 360 into underlying source bits. In one example where channel symbols comprise convolutionally encoded symbols, channel decoder 350 may comprise a Viterbi decoder. In a second example, where channel symbols comprise serial or parallel concatenations of convolutional codes, channel decoder 350 may comprise a turbo decoder.

A memory 330 may be adapted to store machine-readable instructions which are executable to perform one or more of processes, implementations, or examples thereof which are described or suggested herein. The CPU 320 may be adapted to access and execute such machine-readable instructions.

The mobile device 300 also includes a position determination module (PDM) 325 that is configured to perform positioning signal measurements and/or assistance data processing. In one example, the PDM 325 is configured to generate assistance data requests and to transmit such requests to a base station via the radio transceiver 370. In one embodiment, E-CID measurements are the side product of cellular communication and may be performed by components, such as the CPU 320 and/or the baseband processor 360. The E-CID measurements may then be passed on to the PDM 325. In yet another example, the PDM 325 processes assistance data received via the radio transceiver 370. In yet another example, the PDM 325 may perform the measurements of one or more positioning signals with the assistance of the received assistance data to determine a position of the mobile device 300. The PDM 325 and the CPU 320 are illustrated separately for clarity, but may be a single unit.

The CPU 320, as well as one or more of the PDM 325, correlator 340, channel decoder 350, and baseband processor 360 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with the mobile device 300, and is not to be limited to any particular type of memory or number of memories, or type of media upon which memory is stored.

Figure 4:
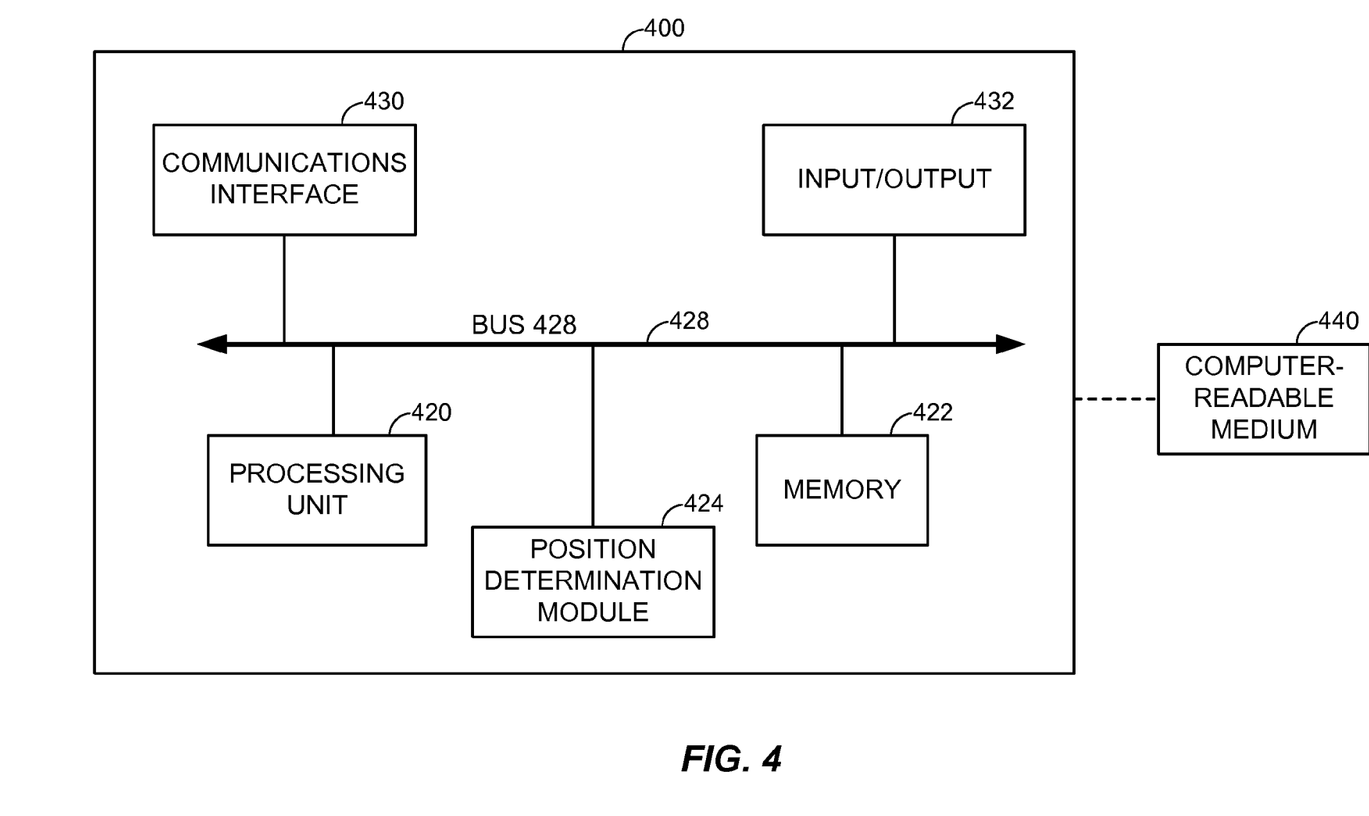
FIG. 4 is a function block diagram of a location server.

FIG. 4 is a functional block diagram of a location server 400 configurable to implement techniques and/or processes described above. For example, the location server 400 may be configured to perform any of the processes described in connection with processes 200 of FIG. 2A, 222 of FIG. 2C, and/or 230 of FIG. 2D. In particular, the location server 400 includes a position determination module (PDM) 424. The PDM 424 provides position determination services for a mobile subscriber. Based on received cell information, measured by the mobile device 300, the PDM 424 is able to determine an estimated physical location of the mobile device 300. In one example, the PDM 424 uses the estimated physical location in order to determine which cells to generate assistance data for and/or to determine the associated search window. The PDM 424 may then send the generated assistance data to the mobile device 300 via communication interface 430.

The location server 400 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

It is recognized that all or part of the various devices and networks shown in the location server 400, and the processes and methods as further described herein, may be implemented using or otherwise including hardware, firmware, software, or any combination thereof.

Thus, by way of example but not limitation, the location server 400 may include at least one processing unit 420 that is operatively coupled to a memory 422 through a bus 428. The processing unit 420 is representative of one or more circuits configurable to perform at least a portion of a data computing procedure or process. By way of example but not limitation, the processing unit 420 may include one or more processors, controllers, microprocessors, microcontrollers, application specific integrated circuits, digital signal processors, programmable logic devices, field programmable gate arrays, and the like, or any combination thereof. In one embodiment, the processing unit 420 alone, or in combination with the PDM 424, is configured to generate assistance data as described above.

The memory 422 is representative of any data storage mechanism. The memory 422 may include, for example, a random access memory, read only memory, etc. While illustrated in this example as being separate from the processing unit 420, it should be understood that all or part of the memory 422 may be provided within or otherwise co-located/coupled with the processing unit 420.

The memory 422 may also include, for example, one or more data storage devices or systems, such as, for example, a disk drive, an optical disc drive, a tape drive, a solid state memory drive, etc. In certain implementations, the memory 422 may be operatively receptive of, or otherwise configurable to couple to, a non-transitory computer-readable medium 440. The non-transitory computer-readable medium 440 may include, for example, any medium that can carry and/or make accessible data, code and/or instructions for the location server 400. The non-transitory computer readable medium 440 may also be referred to as a storage medium.

By way of example but not limitation, the communication interface 430 may include a network interface device or card, a modem, a router, a switch, a transceiver, and the like. The location server 400 may further include, for example, an input/output 432. The input/output 432 is representative of one or more devices or features that may be configurable to accept or otherwise introduce human and/or machine inputs, and/or one or more devices or features that may be configurable to deliver or otherwise provide for human and/or machine outputs. By way of example but not limitation, the input/output 432 may include an operatively configured display, speaker, keyboard, mouse, trackball, touch screen, data port, etc.

In various embodiments, the location server 400 may include means for assisting a mobile device to perform positioning measurements on positioning signals periodically transmitted by at least some of a plurality of cells in a wireless communication system. For example, the location server 400 may include means for receiving cell information (e.g., communication interface 430, processing unit 420, and/or memory 422), obtained by the mobile device 300, of one or more of the plurality of cells in the wireless communication network; means for generating assistance data (e.g., PDM 424) to include an assigned frequency channel number for use by the mobile device 300 for performing the positioning measurements based on the received cell information; and means for sending the assistance data to the mobile device 300 (e.g., communications interface 430, processing unit 420, and/or memory 422).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a non-transitory computer readable media embodying a method for assisting a mobile device to perform positioning measurements on positioning signals periodically transmitted by at least some of a plurality of cells in a wireless communication network. Accordingly, the invention is not limited to illustrated examples, and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for assisting a mobile device to perform positioning measurements on positioning signals periodically transmitted by at least some of a plurality of cells in a wireless communication network, the method comprising:
   receiving cell information, obtained by the mobile device, of one or more of the plurality of cells in the wireless communication network, wherein the cell information indicates an observed frequency channel number of a first cell in the wireless communication network, observed by the mobile device;
   maintaining data corresponding to a known frequency channel number and a known physical frequency of the first cell of the wireless communication network;
   converting the observed frequency channel number to an observed physical frequency of the first cell;
   setting an assigned frequency channel number to the observed frequency channel number if the observed physical frequency is the same as the known physical frequency of the first cell;
   generating assistance data to include the assigned frequency channel number for use by the mobile device for performing the positioning measurements based on the received cell information; and
   sending the assistance data to the mobile device.

2. The method of claim 1, wherein the cell information includes Enhanced Cell ID (E-CID) information of at least one of the plurality of cells.

3. The method of claim 2, wherein the E-CID information includes one or more data selected from a group consisting of: a Mobile Country Code (MCC) of at least one cell in the wireless communication network, a Mobile Network Code (MNC) of the at least one cell, a Cell ID (CID) of the at least one cell, an Rx-Tx time difference corresponding to an estimated time difference between reception and transmission times between the at least one cell and an antenna of the mobile device, a Physical Cell Identifier (PCI) of the at least one cell, an Evolved Absolute Radio Frequency Channel Number (EARFCN) of the at least one cell, a Reference Signal Received Power (RSRP) of the at least one cell, and a Reference Signal Received Quality (RSRQ) of the at least one cell.

4. The method of claim 1, wherein the assigned frequency channel number includes an Evolved Absolute Radio Frequency Channel Number (EARFCN).

5. The method of claim 1, wherein the assigned frequency channel number includes an Absolute Radio Frequency Channel Number (ARFCN).

6. The method of claim 1, wherein a value of the observed frequency channel number is distinct from a value of the known frequency channel number.

7. The method of claim 1, wherein maintaining data corresponding to the known frequency channel number and the known physical frequency comprises maintaining a base station almanac (BSA) at a location server of the wireless communication network.

8. The method of claim 1, wherein receiving the cell information includes receiving the cell information via a Long Term Evolution (LTE) Positioning Protocol (LPP).

9. The method of claim 1, further comprising sending a request to the mobile device for the cell information.

10. An apparatus for assisting a mobile device to perform positioning measurements on positioning signals periodically transmitted by at least some of a plurality of cells in a wireless communication network, the apparatus comprising:
    memory adapted to store program code; and
    a processing unit coupled to the memory to access and execute instructions included in the program code to direct the apparatus to:
       receive cell information, obtained by the mobile device, of one or more of the plurality of cells in the wireless communication network, wherein the cell information indicates an observed frequency channel number of a first cell in the wireless communication network, observed by the mobile device;
       maintain data corresponding to a known frequency channel number and a known physical frequency of the first cell of the wireless communication network;
       convert the observed frequency channel number to an observed physical frequency of the first cell;
       set an assigned frequency channel number to the observed frequency channel number if the observed physical frequency is the same as the known physical frequency of the first cell;
       generate assistance data to include the assigned frequency channel number for use by the mobile device for performing the positioning measurements based on the received cell information; and
       send the assistance data to the mobile device.

11. The apparatus of claim 10, wherein the cell information includes Enhanced Cell ID (E-CID) information of at least one of the plurality of cells.

12. The apparatus of claim 11, wherein the E-CID information includes one or more data selected from a group consisting of: a Mobile Country Code (MCC) of at least one cell in the wireless communication network, a Mobile Network Code (MNC) of the at least one cell, a Cell ID (CID) of the at least one cell, an Rx-Tx time difference corresponding to an estimated time difference between reception and transmission times between the at least one cell and an antenna of the mobile device, a Physical Cell Identifier (PCI) of the at least one cell, an Evolved Absolute Radio Frequency Channel Number (EARFCN) of the at least one cell, a Reference Signal Received Power (RSRP) of the at least one cell, and a Reference Signal Received Quality (RSRQ) of the at least one cell.

13. The apparatus of claim 10, wherein the assigned frequency channel number includes an Evolved Absolute Radio Frequency Channel Number (EARFCN).

14. The apparatus of claim 10, wherein the assigned frequency channel number includes an Absolute Radio Frequency Channel Number (ARFCN).

15. The apparatus of claim 10, wherein a value of the observed frequency channel number is distinct from a value of the known frequency channel number.

16. The apparatus of claim 10, wherein the instructions to maintain the data corresponding to the known frequency channel number and the known physical frequency comprises instructions to maintain a base station almanac (BSA).

17. The apparatus of claim 10, wherein the program code further comprises instructions to direct the apparatus to receive the cell information via a Long Term Evolution (LTE) Positioning Protocol (LPP).

18. The apparatus of claim 10, wherein the program code further comprises instructions to direct the apparatus to send a request to the mobile device for the cell information.

19. An apparatus for assisting a mobile device to perform positioning measurements on positioning signals periodically transmitted by at least some of a plurality of cells in a wireless communication network, the apparatus comprising:
  means for receiving cell information, obtained by the mobile device, of one or more of the plurality of cells in the wireless communication network, wherein the cell information indicates an observed frequency channel number of a first cell in the wireless communication network, observed by the mobile device;
  means for maintaining data corresponding to a known frequency channel number and a known physical frequency of the first cell of the wireless communication network;
  means for converting the observed frequency channel number to an observed physical frequency of the first cell;
  means for setting an assigned frequency channel number to the observed frequency channel number if the observed physical frequency is the same as the known physical frequency of the first cell;
  means for generating assistance data to include the assigned frequency channel number for use by the mobile device for performing the positioning measurements based on the received cell information; and
  means for sending the assistance data to the mobile device.

20. The apparatus of claim 19, wherein the cell information includes Enhanced Cell ID (E-CID) information of at least one of the plurality of cells.

21. The apparatus of claim 19, wherein the assigned frequency channel number includes an Evolved Absolute Radio Frequency Channel Number (EARFCN).

22. The apparatus of claim 19, wherein a value of the observed frequency channel number is distinct from a value of the known frequency channel number.

23. A non-transitory computer-readable medium including program code stored thereon for assisting a mobile device to perform positioning measurements on positioning signals periodically transmitted by at least some of a plurality of cells in a wireless communication network, the program code comprising instructions to:
  receive cell information, obtained by the mobile device, of one or more of the plurality of cells in the wireless communication network, wherein the cell information indicates an observed frequency channel number of a first cell in the wireless communication network, observed by the mobile device;
  maintain data corresponding to a known frequency channel number and a known physical frequency of the first cell of the wireless communication network;
  convert the observed frequency channel number to an observed physical frequency of the first cell;
  set an assigned frequency channel number to the observed frequency channel number if the observed physical frequency is the same as the known physical frequency of the first cell;
  generate assistance data to include the assigned frequency channel number for use by the mobile device for performing the positioning measurements based on the received cell information; and
  send the assistance data to the mobile device.

24. The non-transitory computer-readable medium of claim 23, wherein the cell information includes Enhanced Cell ID (E-CID) information of at least one of the plurality of cells.

25. The non-transitory computer-readable medium of claim 23, wherein the assigned frequency channel number includes an Evolved Absolute Radio Frequency Channel Number (EARFCN).

26. The non-transitory computer-readable medium of claim 23, wherein a value of the observed frequency channel number is distinct from a value of the known frequency channel number.

* * * * *